UNITED STATES PATENT OFFICE 2,395,340

SAPOGENIN DERIVATIVES AND PREPARATION OF SAME

Russell Earl Marker, Mexico City, Mexico, and Harry Means Crooks, Jr., and Eugene Leroy Wittle, Detroit, Mich., assignors to Parke, Davis & Company, Detroit, Mich., a corporation of Michigan No Drawing. Original application May 15, 1941, Serial No. 393,666. Divided and this application May 24, 1944, Serial No. 537,199

14 Claims. (Cl. 260—210)

The invention relates to the preparation of glycosidic pseudo-sapogenin compounds. This application is a division of our copending application, Serial No. 393,666, filed May 15, 1941, now Patent No. 2,352,851, issued July 4, 1944.

In the copending application, Serial No. 393,667, filed May 15, 1941, of Russell Earl Marker, now Patent No. 2,352,852, issued July 4, 1944, it is shown that steroidal sapogenins may be isomerized, for example, by treatment with acetic anhydride for six to fifteen hours at about 200° C., to form a new class of sapogenin derivatives designated as pseudo-sapogenins.

According to the present invention, the pseudo-sapogenins or their ring A and/or B glycosidic derivatives are prepared by reacting glycosidic derivatives of the sapogenins with acidic agents, for example, acylating agents such as acid anhydrides, under conditions more vigorous than those required merely for acylation.

By glycosidic derivatives of the sapogenins we mean sapogenin derivatives in which sugar residues are attached through a hemi-acetal linkage to the cyclopentanoperhydrophenanthrene nucleus. In general, the exact nature of the structures of these substances are not known with certainty. The following formulae illustrate various types of the above sapogenin glycosides.

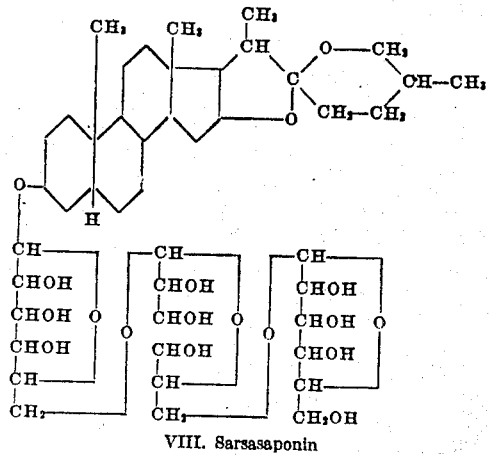

VIII. Sarsasaponin

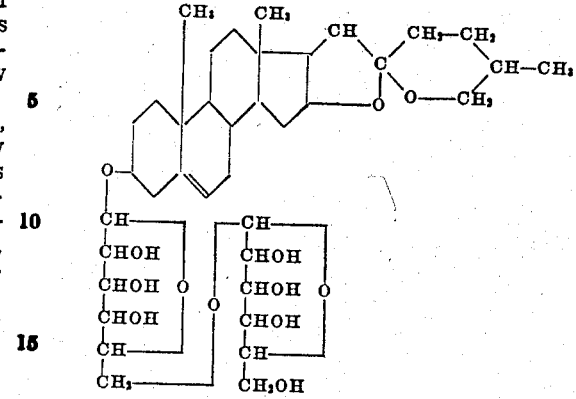

IX. Trillarin

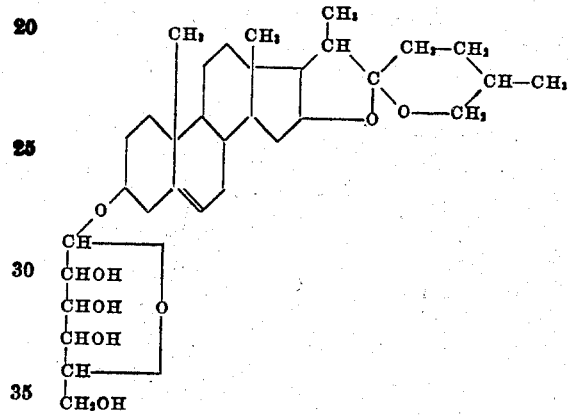

X. Trillin

Generally speaking the glycosides of the steroidal sapogenins may be classified as (1) saponins; (2) simpler glycosides. The former usually contain from three to six sugar units, all of which may be the same, or they may be different. The most commonly occurring sugar units are those of glucose, galactose, rhamnose, and xylose. The simpler glycosides differ from the saponins in that (1) they contain fewer, i. e., one to three, sugar units; (2) they are more readily obtained crystalline; (3) they do not show marked capillary active properties. In most cases, including the compounds represented by VIII, IX, and X, the exact nature of the glycosidic linkages is not definitely known; that is, it is not known whether the sugars have a furanose or pyranose structure, nor which carbon atoms of the different sugar units are (through oxygen) united. In many cases even the number and kind of sugar units present are not known.

See further, Fieser, Chemistry of Natural Products Related to Phenanthrene, 2nd ed., p. 333 ff. (Reinhold Publishing Corporation, New York city, 1937).

Since the steroidal sapogenins occur in nature, not in the free form, but combined with sugar units as glycosidic derivatives, the present invention makes it unnecessary to isolate the sapogenins. Instead, their more readily available glycosides may be converted directly to pseudo-sapogenin derivatives. This elimination of a formerly essential step results in higher yields of steroidal hormones from plant sources.

The pseudo-sapogenins are characterized by the fact that they contain a new type of side chain which undergoes distinctive reactions. Thus the pseudo-sapogenins are unsaturated to bromine and therefore readily decolorize a solution of bromine in acetic acid. On treatment with acids, for example, with alcoholic hydrochloric acid, the pseudo-sapogenins are isomerized to the corresponding steroidal sapogenins. The side chain of the pseudo-sapogenins contains a reactive hydroxyl group which may be acylated, for example, acetylated.

It is believed that the properties of pseudo-sapogenins are best explained if the side chain attached to ring D of the cyclopentanoperhydrophenanthrene nucleus be represented by one of the following partial formulae:

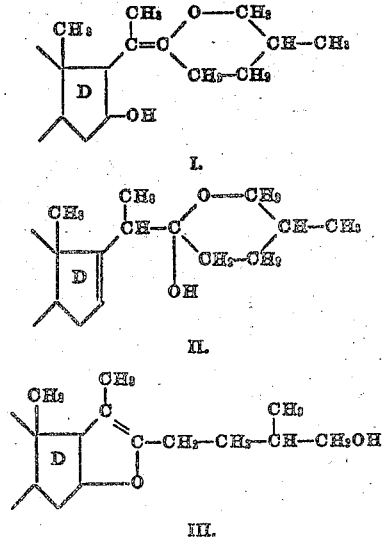

Of these formulae, III seems to account best for the transformations described in the present application.

It will be observed that the partial formulae, I, II and III all contain a reactive hydroxyl group. This hydroxyl group may be acylated to yield compounds which may then be designated as exo-acylates. In the term exo-acylate, the prefix exo has the same significance that it does in other branches of organic chemistry, namely, that the particular function involved is exterior to a ring system and in a position not known with greater certainty.

According to a further feature of our invention, the acylated glycosidic pseudo-sapogenin derivatives may be hydrolyzed with alkaline reagents with production of a glycosidic derivative of a pseudo-sapogenin unacylated at least at the exo hydroxyl group and in the sugar residues.

Our invention may be more fully illustrated by the following examples.

Example 1

(a) The saponins of *Trillium erectum* or from *Dioscorea villosa* may be isolated in the following manner.

The powdered rhizomes are allowed to stand for two days with sufficient alcohol to form a thin cream. This usually requires about 3 parts of alcohol per 1 part of powdered rhizome. After most of the alcohol-soluble material has been leached out in this manner, the cream is filtered and the filter cake washed well with alcohol. The alcohol solution is concentrated to a syrup and the syrup dissolved in about an equal weight or less of hot alcohol. After the solution has cooled, several volumes of ether or petroleum ether are added to cause precipitation of the crude glycoside and to dissolve the fat. The clear solution is decanted from the gummy precipitate and the latter then dissolved in alcohol and a warm alcoholic solution of a sterol such as cholesterol or sitosterol is added. After standing overnight most of the saponin has been precipitated in the form of a sterol adduct. This is collected and washed with a small amount of alcohol. After this addition compound has been air dried, it is dissolved in about 2 volumes of pyridine by warming on the steam bath for about fifteen minutes. After solution is complete about 5-10 volumes of ether is added, causing precipitation of the free saponin. This is filtered and washed with ether. It may be purified by dissolving it in alcohol or water and adding ether to reprecipitate the purified saponin. As thus obtained it is a white microcrystalline powder fairly soluble in alcohol and water but insoluble in ether and petroleum ether. With sterols having a 3-($\beta$)-hydroxyl group it forms insoluble adducts.

One hundred and fifty grams of the saponin from *Trillium erectum* is acetylated in the following fashion. The saponin is dissolved in 5 volumes of pyridine, and 4 volumes of acetic anhydride added. After heating on the steam bath for one hour, the mixture is poured into ether and the ethereal solution washed with water to remove pyridine and acetic acid. The ethereal layer is evaporated to leave a gummy residual acetate which after standing a few days and rubbing with a glass rod crystallizes. This product may be recrystallized from organic solvent and then has the melting point of about 146° C.

(b) One hundred and fifty grams of the above acetylated saponin is dissolved in 100 cc. of acetic anhydride and heated in a bomb tube or autoclave at 200° C. for ten hours. Then the acetic anhydride is removed under reduced pressure. This residue is the acetate of *Trillium erectum* pseudo-saponin.

(c) The above acetylated *Trillium erectum* pseudo-saponin is dissolved in 2 liters of glacial acetic acid and added at 30° C. to a stirred solution of 25 g. of chromic anhydride in 1 liter of 60% acetic acid. After the mixture has stood one and a half hours at this temperature, the excess chromic anhydride is destroyed by addition of zinc powder. The solution is filtered from excess zinc and the filtrate is concentrated in vacuo. The residue is dissolved in ether and washed with water and saturated sodium bicarbonate solution. The ethereal solution is evaporated to leave a clear yellow gummy residue weighing about 120 g. This residue consists essentially of the substance representable by the formula

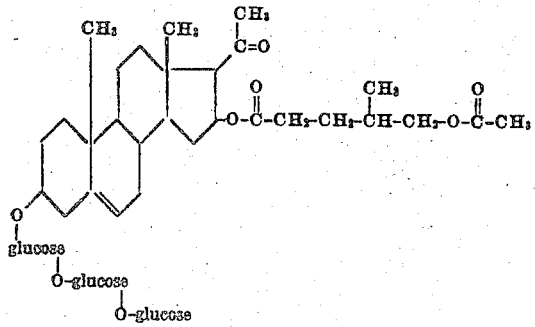

(d) The above residue is dissolved in 1½ liters of 90% alcohol and a solution of 350 g. of potassium hydroxide in an equal amount of water is added. The solution is refluxed twenty minutes during which time a gum precipitates on the sides of the flask. Then water is added to bring the alcohol concentration down to about 60%. Then enough concentrated hydrochloric acid is added to neutralize the potassium hydroxide (litmus paper test) and to give an excess of about 50 cc. of concentrated hydrochloric acid. The resulting solution is boiled three hours to complete the hydrolysis.

The solution is now thoroughly extracted with ether and the ethereal layer washed free of alcohol and acid by repeated washing with water and 5% sodium hydroxide solution. Then the ethereal solution is concentrated to leave about 15 g. of an oily residue which is impure $\Delta^{5,16}$-pregnadienol-3-($\beta$)-one-20. It is best purified by isolating it as the acetate. To do this, the oily residue is acetylated by boiling with 2 volumes of acetic anhydride for about half an hour. Then the acetic anhydride is evaporated under reduced pressure and the residue is crystallized from methanol to yield 7-10 g. of $\Delta^{5,16}$-pregnadienol-3-($\beta$)-one-20 acetate of melting point 174-6° C.

(e) Seven grams of the above $\Delta^{5,16}$-pregnadienol-3-($\beta$)-one-20 acetate is dissolved in about 500 cc. of alcohol and 7 g. of a palladium-barium sulfate catalyst containing 3% by weight of palladium is added. After shaking this mixture in a hydrogen atmosphere at about 30 lbs. pressure for half an hour, the hydrogenation is essentially complete. The solution is filtered and the residue concentrated and set aside to crystallize. Thus there is obtained $\Delta^5$-pregnenol-3-($\beta$)-one-20 acetate of melting point 149-51° C.

This may be hydrolyzed by refluxing it with 10 times its weight of 5% methanolic potassium hydroxide. The resultant solution is diluted with water and extracted with ether and the ether evaporated to leave the free hydroxy ketone. After recrystallization the $\Delta^5$-pregnenol-3-($\beta$)-one-20 thus obtained has a melting point of 188-90° C.

(f) Two grams of $\Delta^5$-pregnenol-3-($\beta$)-one-20 obtained for example as described above is heated for an hour at 200° C. with about half its weight of platinum black in an atmosphere of nitrogen. Then the mixture is dissolved in boiling ligroin and set aside to crystallize. The progesterone so obtained has a melting point of 127-8.5° C. and a biological activity of 1-2 International Units per milligram.

Example 2

(a) A solution of 10 g. of diosgenin, 13 g. of bromacetylglucose and 5 g. of mercuric acetate in 120 cc. of dry benzene is refluxed for two hours. Then the solution is evaporated to leave an oily residue and the latter is dissolved in ether. The ethereal solution is concentrated to a small volume and chilled. The crystalline precipitate which appears is collected and triturated with ether. The crude glucoside thus obtained is recrystallized from methanol and then has a melting point of 197° C. It shows no depression in melting point when mixed with trillin acetate of melting point 199-201° C. as obtained from *Trillium erectum*. This glucoside is therefore diosgenin-$\alpha$-glucoside tetraacetate.

On hydrolysis with 2% methanolic potassium hydroxide the above glucoside tetraacetate yields trillin of melting point 250° C. and giving no depression in melting point when mixed with an authentic sample isolated from *Trillium erectum*.

(b) A mixture of 5.2 g. of trillin tetraacetate and 15 cc. of acetic anhydride are heated in a bomb tube for ten hours at 200° C. The mixture then is distilled under reduced pressure to remove the acetic anhydride. The residue may be crystallized from methanol to yield pseudo-trillin acetate of melting point 165° C.

(c) To a solution of 4 g. of the pseudo-trillin acetate in 200 cc. of acetic acid cooled to 15° C. is added with stirring a solution of 1.2 g. of chromic anhydride in 20 cc. of 90% acetic acid. After the solution has stood for an hour at 25° C. water is added and the product is extracted with ether. The ethereal layer is washed well with water and 5% sodium hydroxide solution. Then the ether is evaporated to leave a crystalline residue. This is refluxed for ninety minutes with 50 cc. of alcohol containing 5 cc. of concentrated hydrochloric acid. Then the mixture is diluted with water, extracted with ether, the ethereal layer washed with water and sodium carbonate solution and then the ether removed on a steam bath. The residue is purified by treatment in the known manner with Girard's reagent and the ketone thus obtained distilled in a high vacuum at 120-140° C. The distillate is crystallized from ether, acetone, and dilute methanol and thus gives $\Delta^{5,16}$-pregnadienol-3-($\beta$)-one-20 of melting point 210-212° C.

This may be converted to progesterone, for example, according to the method described in the previous example.

Example 3

(a) A mixture of 10 g. of sarsasapogenin, 13 g. of bromoacetyl glucose and 5 g. of mercuric acetate in 120 cc. of dry benzene is refluxed for two hours. The solution is evaporated in vacuo and the residue dissolved in ether. The ethereal solution is concentrated to a small volume and chilled. The crystalline material which separates is collected, triturated with ether and recrystallized from alcohol to give sarsasapogenin-$\alpha$-glucoside tetraacetate of M. P. 227° C.

The above tetraacetyl glucoside may be hydrolyzed by letting it stand overnight with 2% methanolic potassium hydroxide solution. Thus there is obtained sarsasapogenin-α-glucoside of M. P. 245° C.

(b) Five grams of sarsasapogenin-α-glucoside tetraacetate and 20 cc. of acetic anhydride are heated in a bomb tube for eight hours at 200° C. Then the acetic anhydride is removed in vacuo to leave a residue of pseudo-sarsasapogenin-α-glucoside penta-acetate. This substance may be represented by the following structural formula,

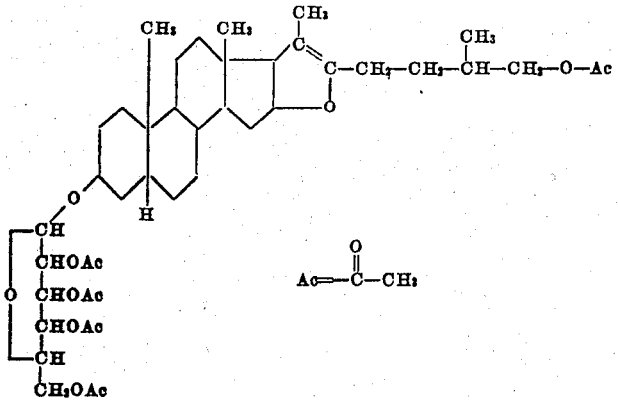

The above examples are intended to illustrate but not to limit the present invention and numerous variations in regard to starting materials, conditions of reaction, modes of isolation of the product and other details will be apparent to those skilled in the art after a perusal of this specification.

For example, as naturally occurring glycosidic derivatives of steroidal sapogenins which may be used in the practice of this invention there may be mentioned amolonin, sarsasaponin, digitonin, or like steroidal saponins. Also, there may be used partially degraded glycosidic derivatives of these saponins, such as trillarin or trillin. Such partially degraded glycosidic derivatives of saponins are obtained by hydrolyzing the saponin at some of the oligosacharide linkages by means of enzymes or dilute acids or similar reagents. Again, there may be used synthetic glycosidic derivatives of steroidal sapogenins such as the synthetic galactosides, glucosides, ribosides, and other glycosides of sapogenins such as sarsasapogenin, diosgenin, or other steroidal sapogenins containing reactive nuclear hydroxyl groups. Synthetic glycosides suitable for the practice of this invention may also be prepared from sapogenins which have reactive nuclear hydroxyl groups, but which are not aglycones of naturally occurring saponins. For example, although neither epi-sarsasapogenins nor its glycosides occur in nature, glycosides of epi-sarsasapogenins may be prepared synthetically from sarsasaponin by converting the latter into its aglycone, sarsasapogenin, and then converting this into epi-sarsasapogenin. The epi-sarsasapogenin may then be treated to form the glycoside as for example by treatment with bromoacetoglucose.

The conversion of the glycosidic derivative of the steroidal sapogenin into an acylated glycosidic pseudo-sapogenin may be effected by treating the former with an acylating agent under conditions more vigorous than those required for mere acylation. This step may be effected, for example, by treatment of the glycosidic derivatives of the sapogenins with a carboxylic anhydride at 175–250° C. We have found that best results are obtained with lower fatty acid anhydrides while maintaining the reaction temperature in the neighborhood of 200° C. The product thus formed is an acylated glycosidic pseudo-sapogenin derivative acylated at least at the exo-hydroxyl group and in the sugar residues.

This product may then be converted into other useful products as set forth in our parent application, Serial No. 393,666 above referred to.

What we claim as our invention is:

1. The process which comprises isomerizing and acylating the side chain attached to ring D of a glycosidic derivative of a steroidal sapogenin by reacting said glycosidic derivative with an acylating agent under conditions more vigorous than those required for mere acylation, with production of a glycosidic derivative of a pseudo-sapogenin acylated at least at the exo-hydroxyl group and in the sugar residues.

2. The process which comprises isomerizing and acylating the side chain attached to ring D of a glycosidic derivative of a steroidal sapogenin by reacting said glycosidic derivative with a carboxylic acid anhydride at 175–250° C., with production of a glycosidic derivative of a pseudo-sapogenin acylated at least at the exo-hydroxyl group and in the sugar residue.

3. The process which comprises isomerizing and acylating the side chain attached to ring D of a glycosidic derivative of a steroidal sapogenin by reacting said glycosidic derivative with a lower fatty acid anhydride at approximately 200° C., with production of a glycosidic derivative of a pseudo-sapogenin acylated at least at the exo-hydroxyl group and in the sugar residues.

4. The process which comprises subjecting a glycosidic derivative of a pseudo-sapogenin acylated at least at the exo-hydroxyl group and in the sugar residues to hydrolysis with an alkaline reagent, with production of a glycosidic derivative of a pseudo-sapogenin unacylated at least at the exo-hydroxyl group and in the sugar residues.

5. The process for the preparation of steroidal compounds which comprises isomerizing and acylating the side chain attached to ring D of a glycosidic derivative of a steroidal sapogenin selected from the class consisting of sarsasapogenin, and diosgenin, by reacting said glycosidic derivative with a carboxylic acid anhydride at 175–250° C., with production of a glycosidic derivative of a member of the class consisting of pseudo-sarsasapogenin, and pseudo-diosgenin, said glycosidic pseudo-sapogenin derivative being acylated at least at the exo-hydroxyl group and in the sugar residues.

6. The process for the preparation of steroidal compounds which comprises isomerizing and acylating the side chain attached to ring D of a glycosidic derivative of a steroidal sapogenin selected from the class consisting of sarsasapogenin, and diosgenin, by reacting said glycosidic derivative with a lower fatty acid anhydride at approximately 200° C., with production of a glycosidic derivative of a member of the class consisting of pseudo-sarsasapogenin, and pseudo-diosgenin, said glycosidic pseudo-sapogenin derivative being acylated at least at the exo-hydroxyl group and in the sugar residues.

7. The process of preparing an acylated *Trillium erectum* pseudo-saponin which comprises reacting a *Trillium erectum* saponin with an acylating agent under conditions more vigorous than those required for mere acylation thereby obtaining a *Trillium erectum* pseudo-saponin acylated at the exo-hydroxyl group and in the sugar residues.

8. The process of preparing a pseudo-trillin acylate which comprises reacting a diosgenin glycoside with an acylating agent under conditions more vigorous than those required for mere acylation thereby obtaining a pseudo-trillin acylate.

9. The process of preparing an acylated pseudo-sarsasapogenin which comprises reacting a sarsasapogenin glucoside with an acylating agent under conditions more vigorous than those required for mere acylation thereby obtaining a pseudo-sarsasapogenin glucoside acylated at the exo-hydroxyl group and in the sugar residues.

10. A glycosidic pseudo-sapogenin acylated at least at the exo-hydroxyl group and in the sugar residues.

11. A glycosidic pseudo-sapogenin acetylated at least at the exo-hydroxyl group and in the sugar residues.

12. Completely acetylated *Trillium erectum* pseudo-saponin.

13. Pseudo-sarsasapogenin - $\alpha$ - glucose pentaacetate.

14. Pseudo-trillin acetate.

RUSSELL EARL MARKER.
HENRY MEANS CROOKS, Jr.
EUGENE LEROY WITTLE.